(12) United States Patent
Oe (10) Patent No.: US 8,473,178 B2
(45) Date of Patent: Jun. 25, 2013

(54) CONTROL DEVICE AND CONTROL METHOD FOR VEHICLE

(75) Inventor: Yu Oe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 437 days.

(21) Appl. No.: 12/810,269

(22) PCT Filed: Jan. 30, 2009

(86) PCT No.: PCT/JP2009/051547
§ 371 (c)(1),
(2), (4) Date: Jun. 23, 2010

(87) PCT Pub. No.: WO2009/110269
PCT Pub. Date: Sep. 11, 2009

(65) Prior Publication Data
US 2010/0280740 A1    Nov. 4, 2010

(30) Foreign Application Priority Data
Mar. 7, 2008   (JP) .................................. 2008-057687

(51) Int. Cl.
*F01N 3/00*    (2006.01)
*F01N 3/28*    (2006.01)

(52) U.S. Cl.
USPC ............................... 701/102; 701/54; 60/285

(58) Field of Classification Search
USPC .............. 701/102, 101, 54; 60/295, 301, 285, 60/286
See application file for complete search history.

(56) References Cited

U.S. PATENT DOCUMENTS

| 7,181,337 | B2 | 2/2007 | Kosaka | |
| 2002/0053200 | A1* | 5/2002 | Ohuchi et al. | 60/285 |
| 2007/0079601 | A1 | 4/2007 | Hirata et al. | |
| 2008/0087009 | A1 | 4/2008 | Nishina et al. | |

FOREIGN PATENT DOCUMENTS

| JP | 2002 527660 | | 8/2002 |
| JP | 2002 317670 | | 10/2002 |
| JP | 2002 371831 | | 12/2002 |
| JP | 2005 113708 | | 4/2005 |
| JP | 2005 147118 | | 6/2005 |
| JP | 2006 9606 | | 1/2006 |
| JP | 2006090334 A | * | 4/2006 |
| JP | 2006 170057 | | 6/2006 |
| JP | 2006 226171 | | 8/2006 |
| JP | 2006 342771 | | 12/2006 |
| JP | 2007 255367 | | 10/2007 |

* cited by examiner

*Primary Examiner* — Mahmoud Gimie
(74) *Attorney, Agent, or Firm* — Oblon, Spivak, McClelland, Maier & Neustadt, L.L.P.

(57) ABSTRACT

An ECU executes a program including: detecting an amount of an aqueous urea solution; setting a predetermined operation line if the solution amount is equal to or more than 15%; setting a predetermined operation line if the solution amount is equal to or more than 10%; setting a predetermined operation line if the solution amount is less than 10%; controlling an engine based on a set operation line; controlling a motor generator; calculating a degree of deterioration of fuel efficiency; and performing display control.

21 Claims, 6 Drawing Sheets

CONTROL DEVICE AND CONTROL METHOD FOR VEHICLE

TECHNICAL FIELD

The present invention relates to a control device for a vehicle equipped with an internal combustion engine, and to a technique of changing an operation line of the internal combustion engine in accordance with a reserved amount of a reducing agent to be supplied to an exhaust path.

BACKGROUND ART

Conventionally, an SCR (Selective Catalytic Reduction) device has been known as a device for purifying nitrogen oxide (hereinafter described as NOx) in exhaust gas emitted from an engine.

The SCR device injects a reducing agent (for example, ammonia or the like) to an exhaust path of the engine to make NOx in the exhaust gas and the reducing agent to react on a catalyst, thereby reducing and purifying NOx.

To control an engine equipped with such an SCR device, for example, Japanese Patent Laying-Open No. 2005-147118 (Patent Document 1) discloses an exhaust gas purification device for an engine that urges a driver to have an SCR device repaired immediately when an abnormality occurs in the SCR device and provides appropriate management of the SCR device. The exhaust gas purification device for an engine includes reducing agent addition means adding a reducing agent for NOx to exhaust gas from the engine, abnormality detection means detecting occurrence of an abnormality in the reducing agent addition means, and engine control means providing control, when occurrence of an abnormality is detected by the abnormality detection means, to limit operation of the engine, or to set output characteristics of the engine with respect to accelerator operation by the driver to be different from those in normal operation other than operation at the time of occurrence of an abnormality.

According to the exhaust gas purification device for an engine, when an addition device has an abnormality and cannot add an appropriate amount of the reducing agent to the exhaust gas, operation of the engine is limited, for example, restart of the engine that has been once stopped is disabled. Thereby, traveling in a state where NOx is not sufficiently purified can be limited, and the driver can be urged to have the addition device repaired. Further, in addition to or instead of limiting operation of the engine, by changing the output characteristics of the engine with respect to the accelerator operation, for example, by decreasing a fuel injection amount set for the same amount of accelerator operation to be smaller than that in normal operation, traveling can be limited and the driver can be urged to have the addition device repaired.
Patent Document 1: Japanese Patent Laying-Open No. 2005-147118

DISCLOSURE OF THE INVENTION

Problems to be Solved by the Invention

When no reducing agent is reserved and it becomes impossible to inject the reducing agent to the exhaust path, an NOx concentration cannot be decreased, causing deterioration of exhaust gas purification performance. To suppress deterioration of exhaust gas emission due to the deterioration of exhaust gas purification performance, it is also conceivable to stop a vehicle at a time point when no reducing agent is reserved. With such a structure, however, there may be a case where the vehicle cannot move until it is replenished with the reducing agent.

In the exhaust gas purification device for an engine disclosed in the publication described above, when an abnormality occurs in the addition device for the reducing agent, such as when no reducing agent is reserved, operation of the engine is limited or the fuel injection amount corresponding to the accelerator operation is decreased.

However, if an output of the engine is suddenly limited at a time point when no reducing agent is reserved, the driver may feel that the vehicle's behavior suddenly becomes not normal. Further, since the output of the engine is limited, performance of the vehicle desired by the driver cannot be achieved.

The present invention has been made to solve the aforementioned problems, and one object of the present invention is to provide a control device and a control method for a vehicle exhibiting performance corresponding to a driver's intention while suppressing an increase in nitrogen oxide in exhaust gas from an internal combustion engine when no reducing agent is reserved. Another object of the present invention is to provide a control device and a control method for a vehicle appropriately informing a driver of presence or absence of a reducing agent.

Means for Solving the Problems

A control device for a vehicle in accordance with an aspect of the present invention is a control device for a vehicle equipped with an internal combustion engine. The internal combustion engine includes an exhaust path, an injection device injecting a reducing agent to the exhaust path, and a reserving unit reserving the reducing agent. The control device includes a reserved amount detection unit detecting a reserved amount of the reducing agent in the reserving unit, and a control unit receiving an output from the reserved amount detection unit. The control unit changes an operation line of the internal combustion engine to an operation line with a lower degree of generation of nitrogen oxide step by step in accordance with a decrease in the detected reserved amount, and controls an output of the internal combustion engine based on the changed operation line.

According to the present invention, an operation line of the internal combustion engine is changed to an operation line on a side with a lower NOx concentration step by step in accordance with a decrease in the reserved amount of the reducing agent. This suppresses a driver from feeling that the vehicle's behavior suddenly becomes not normal when there is no reserved amount of the reducing agent. In addition, since the operation line of the internal combustion engine is changed to an operation line with a lower degree of generation of NOx, an increase in the NOx concentration can be suppressed. Accordingly, an increase in the NOx concentration in exhaust gas can be suppressed. Further, when an operation point is changed from an operation point on the operation line before change to the changed operation line, for example on an equal output line, the vehicle can continue traveling without limiting the output of the internal combustion engine. Consequently, a control device and a control method for a vehicle exhibiting performance corresponding to a driver's intention while suppressing an increase in nitrogen oxide in exhaust gas from an internal combustion engine when no reducing agent is reserved can be provided.

Preferably, the operation line changed in accordance with the decrease in the reserved amount is an operation line with a lower degree of generation of torque with respect to a rotation speed of the internal combustion engine, when compared with the operation line before change.

According to the present invention, with the decrease in the reserved amount of the reducing agent, the operation line of the internal combustion engine is changed to an operation line with a lower degree of generation of torque with respect to a rotation speed of the internal combustion engine, among a plurality of predetermined operation lines. Thereby, the operation line of the internal combustion engine is changed to an operation line with a lower degree of generation of NOx, an increase in the NOx concentration can be suppressed.

More preferably, the operation line of the internal combustion engine is set corresponding to a case where the reserved amount of the reducing agent in the reserving unit is equal to or more than a predetermined amount, and includes at least a first operation line as an optimum fuel efficiency operation line of the internal combustion engine, a second operation line set corresponding to a case where the reserved amount of the reducing agent in the reserving unit is zero, and a third operation line set between the first operation line and the second operation line. The control unit changes the operation line of the internal combustion engine to an operation line corresponding to the detected reserved amount among the first operation line, the second operation line, and the third operation line.

According to the present invention, in the case where the reserved amount of the reducing agent is equal to or more than a predetermined amount, the output of the internal combustion engine is controlled along the optimum fuel efficiency operation line of the internal combustion engine. Thereby, the internal combustion engine can be operated with the NOx concentration in the exhaust gas being decreased by injecting the reducing agent and with deterioration of fuel efficiency of the internal combustion engine being suppressed. On the other hand, in the case where the detected reserved amount is zero, the output of the internal combustion engine is controlled along an operation line set corresponding to the case where the reserved amount is zero. Thereby, the degree of generation of NOx can be decreased, and an increase in the NOx concentration in the exhaust gas can be suppressed. Further, the operation line is changed step by step from the first operation line to the second operation line via the third operation line, in accordance with a decrease in the reserved amount. This suppresses the driver from feeling that the vehicle's behavior suddenly becomes not normal.

More preferably, the control unit controls the output of the internal combustion engine by changing an operation point along an equal output line in accordance with change of the operation line.

According to the present invention, the output of the internal combustion engine is controlled by changing an operation point along an equal output line in accordance with change of the operation line. Thereby, the internal combustion engine can be operated without limiting the output thereof.

More preferably, the control device further includes a traveling distance detection unit detecting a physical quantity related to a traveling distance of the vehicle, an injection amount calculation unit calculating an injection amount of fuel injected to the internal combustion engine, a deterioration degree calculation unit calculating a degree of deterioration of fuel efficiency of the internal combustion engine based on the detected physical quantity and a supply amount of the fuel, and a fuel efficiency informing unit informing a driver of the calculated degree of deterioration of fuel efficiency.

According to the present invention, when the operation line is changed to an operation line with a lower degree of generation of the NOx due to a decrease in the reserved amount of the reducing agent, fuel efficiency of the internal combustion engine is deteriorated. Therefore, by informing the driver of the degree of deterioration of fuel efficiency, the driver can recognize that the fuel efficiency is worse than usual. That is, the driver can be urged to replenish the reducing agent. Consequently, a control device and a control method for a vehicle appropriately informing a driver of presence or absence of a reducing agent can be provided.

More preferably, the control device further includes a solution amount informing unit informing a driver of the detected reserved amount.

According to the present invention, by informing the driver of a decrease in the reserved amount of the reducing agent, the driver can be urged to replenish the reducing agent. Consequently, the driver can be appropriately informed of presence or absence of the reducing agent.

More preferably, the internal combustion engine is a lean burn gasoline engine.

According to the present invention, by applying the present invention to a lean burn gasoline engine, an increase in the NOx concentration can be suppressed while avoiding the driver from feeling that the vehicle suddenly falls into a state that is not normal by changing the operation line step by step.

More preferably, the internal combustion engine is a diesel engine.

According to the present invention, by applying the present invention to a diesel engine, an increase in the NOx concentration can be suppressed while avoiding the driver from feeling that the vehicle suddenly becomes not normal by changing the operation line step by step.

More preferably, the vehicle is a hybrid vehicle having the internal combustion engine and a rotating electric machine as drive sources.

According to the present invention, by applying the present invention to a hybrid vehicle, an increase in the NOx concentration can be suppressed while avoiding the driver from feeling that the vehicle suddenly becomes not normal by changing the operation line step by step without limiting the output of the internal combustion engine.

More preferably, the vehicle is a vehicle equipped with a continuously variable transmission continuously changing a gear ratio.

According to the present invention, by applying the present invention to a vehicle equipped with a continuously variable transmission, an increase in the NOx concentration can be suppressed while avoiding the driver from feeling that the vehicle suddenly becomes not normal by changing the operation line step by step without limiting the output of the internal combustion engine.

DESCRIPTION OF THE REFERENCE SIGNS

120: engine, 122: intake path, 122A: air cleaner, 122B: air flow meter, 122C: electronic throttle valve, 122D: throttle position sensor, 124: exhaust path, 124A: air-fuel ratio sensor, 124B: three-way catalytic converter, 124C: catalyst temperature sensor, 124D: silencer, 130: fuel injection device, 140A, 140B: motor generator, 160: drive wheels, 180: reduction gear, 200: motive power split mechanism, 220: traveling battery, 240: inverter, 242: converter, 300: input I/F, 312: aqueous urea solution amount sensor, 314: aqueous urea solution injection device, 316: aqueous urea solution tank, 318: accelerator position sensor, 330: vehicle speed sensor, 340: display device, 342: solution amount indicator, 344: fuel efficiency indicator, 360: water temperature detection sensor, 380: crank position sensor, 400: computation processing unit, 402: solution amount determination unit, 404: operation line setting unit, 406: engine control unit, 408: MG control unit, 410: injection amount calculation unit, 412: fuel efficiency calculation unit, 414: display control unit, 500: storage unit, 600: output I/F.

BEST MODES FOR CARRYING OUT THE INVENTION

Hereinafter, an embodiment of the present invention will be described with reference to the drawings. In the description below, identical parts will be designated by the same reference numerals. Since their names and functions are also the same, the description thereof will not be repeated.

Figure 1:
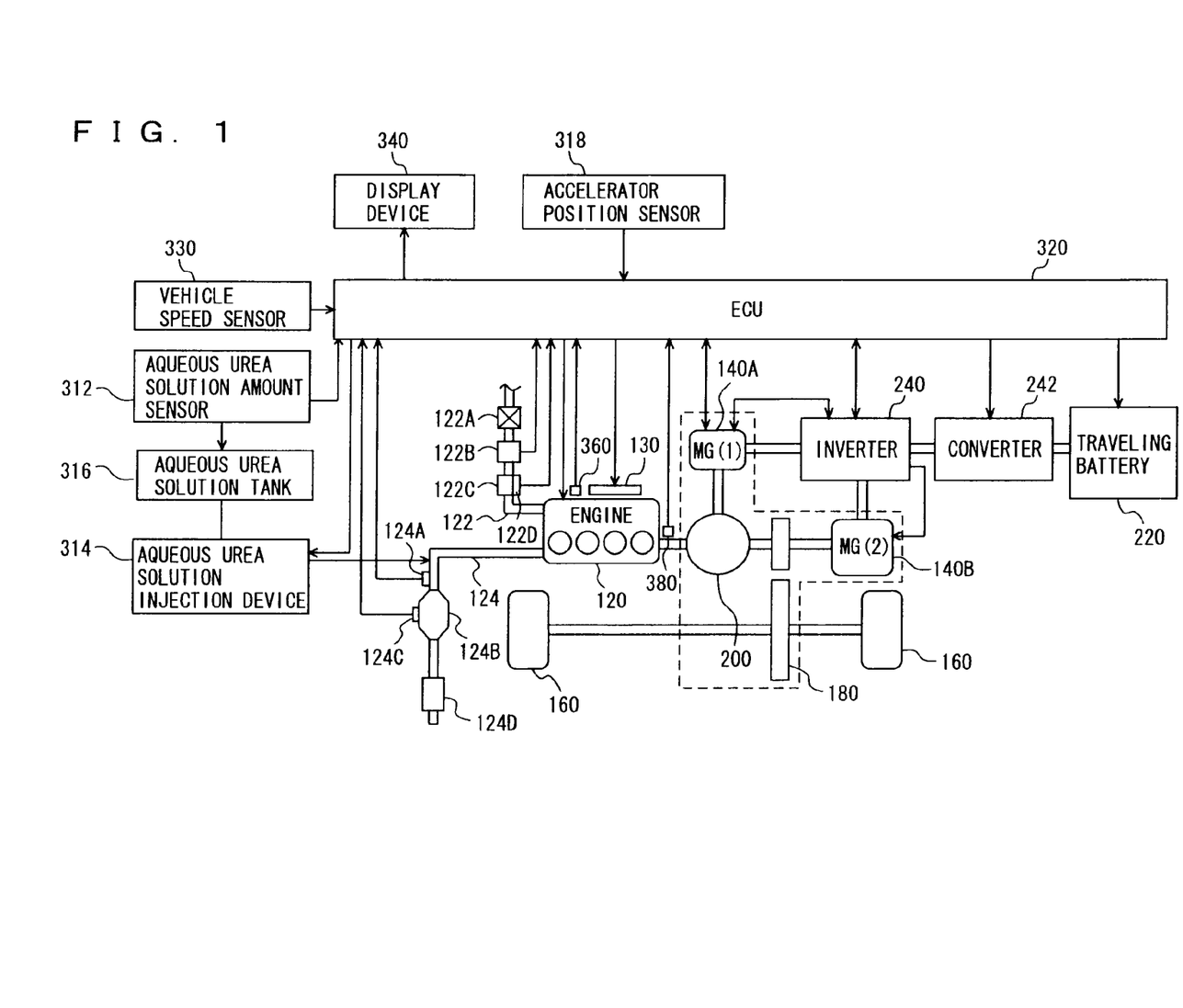
FIG. 1 is a control block diagram of a hybrid vehicle in the present embodiment.

Referring to FIG. 1, a control block diagram of a hybrid vehicle to which a control device in accordance with an embodiment of the present invention is applied will be described.

The hybrid vehicle includes, as drive sources, an internal combustion engine (hereinafter simply referred to as an engine) 120 that requires NOx purification such as a lean burn gasoline engine or a diesel engine, and a motor generator (hereinafter simply referred to as an MG)(1) 140A and MG(2) 140B serving as rotating electric machines. In the present embodiment, a description will be given of a case where engine 120 is a lean burn gasoline engine.

Although the description in the present embodiment will be given of an exemplary case where the present invention is applied to a hybrid vehicle, application of the present invention is not particularly limited to a hybrid vehicle, and the present invention may be applied, for example, to a vehicle equipped with an engine and a continuously variable transmission.

An intake path 122 of engine 120 is provided with an air cleaner 122A catching dust in intake air, an air flow meter 122B detecting an amount of air passing through air cleaner 122A to be taken into engine 120, and an electronic throttle valve 122C as a valve for adjusting the amount of air to be taken into engine 120. Electronic throttle valve 122C is provided with a throttle position sensor 122D. The amount of intake air detected by air flow meter 122B, an opening degree of electronic throttle valve 122C detected by throttle position sensor 122D, and the like are input to an ECU (Electronic Control Unit) 320.

Engine 120 is provided with a plurality of cylinders and a fuel injection device 130 injecting fuel to each cylinder. Fuel injection device 130 injects an appropriate amount of fuel to each cylinder at an appropriate time based on a fuel injection control signal from ECU 320.

Further, an exhaust path 124 of engine 120 is provided with a three-way catalytic converter 124B, an air-fuel ratio sensor 124A detecting an air-fuel ratio (A/F) of exhaust gas to be introduced into three-way catalytic converter 124B, a catalyst temperature sensor 124C detecting a temperature of three-way catalytic converter 124B, and a silencer 124D. The air-fuel ratio of the exhaust gas to be introduced into three-way catalytic converter 124B detected by air-fuel ratio sensor 124A, the temperature of three-way catalytic converter 124B detected by catalyst temperature sensor 124C, and the like are input to ECU 320.

Air-fuel ratio sensor 124A is an all-range air-fuel ratio sensor (linear air-fuel ratio sensor) that generates an output voltage proportional to an air-fuel ratio of an air-fuel mixture burned in engine 120. In the present embodiment, air-fuel ratio sensor 124A has a detection element, and outputs a signal corresponding to an air-fuel ratio of engine 120 by contact of the exhaust gas from engine 120 with the detection element. As air-fuel ratio sensor 124A, an O2 sensor detecting in an on-off manner whether the air-fuel ratio of the air-fuel mixture burned in engine 120 is rich or lean with respect to a theoretical air-fuel ratio may be used.

Further, a signal indicating a temperature of engine cooling water is input to ECU 320 from a water temperature detection sensor 360 detecting the temperature of cooling water for engine 120. An output shaft of engine 120 is provided with a crank position sensor 380, and a signal indicating a rotation speed of the output shaft is input to ECU 320 from crank position sensor 380.

The hybrid vehicle further includes a reduction gear 180 transmitting motive power generated in engine 120 and MG(2) 140B to drive wheels 160 or transmitting drive of drive wheels 160 to engine 120 and MG(2) 140B, a motive power split mechanism (for example, a planetary gear mechanism) 200 distributing motive power generated by engine 120 to two routes, namely, to drive wheels 160 and to MG(1) 140A, a traveling battery 220 charged with electric power for driving MG(1) 140A and MG(2) 140B, an inverter 240 performing current control while converting between a direct current of traveling battery 220 and alternating currents of MG(1) 140A and MG(2) 140B, and the like.

ECU 320 manages and controls a charge/discharge state of traveling battery 220, controls an operation state of engine 120, controls MG(1) 140A, MG(2) 140B, inverter 240, and the like in accordance with a state of the hybrid vehicle, and controls an aqueous urea solution injection device 314 described later.

Although the present embodiment describes a case where integrated ECU 320 controls charging of traveling battery 220, controls engine 120, controls MG(1) 140A and MG(2) 140B, and controls aqueous urea solution injection device 314, the present invention is not particularly limited to such a case. For example, the vehicle may be further provided with a battery ECU managing and controlling a charge/discharge state of traveling battery 220, an engine ECU controlling an operation state of engine 120, a catalyst ECU controlling an amount of an aqueous urea solution to be injected by aqueous urea solution injection device 314, and an MG_ECU controlling MG(1) 140A, MG(2) 140B, the battery ECU, inverter 240, and the like in accordance with a state of the hybrid vehicle, and ECU 320 may mutually manage and control the battery ECU, the engine ECU, the catalyst ECU, the MG_ECU, and the like to control an entire hybrid system such that the hybrid vehicle can travel most efficiently. The traveling battery may be replaced with a power storage device such as a capacitor or the like.

In the present embodiment, a converter 242 is provided between traveling battery 220 and an inverter 240. Since the rated voltage of traveling battery 220 is lower than the rated voltages of MG(1) 140A and MG(2) 140B, when electric power is supplied from traveling battery 220 to MG(1) 140A and MG(2) 140B, the electric power is boosted in converter 242. Converter 242 has a built-in smoothing capacitor. When converter 242 performs boost operation, electric charge is stored in the smoothing capacitor.

A driver's seat is provided with an accelerator pedal (not shown), and an accelerator position sensor 318 detects an amount of depression of the accelerator pedal. Accelerator position sensor 318 outputs a signal indicating the amount of depression of the accelerator pedal to ECU 320. ECU 320 controls an output or a power generation amount of MG(1) 140A, an output or a power generation amount of MG(2) 140B, and an output of engine 120 in accordance with a required drive force corresponding to the amount of depression.

Further, a vehicle speed sensor 330 is a sensor detecting a physical quantity related to a speed of the vehicle. The "physical quantity related to the speed of the vehicle" may be, for example, a rotation speed of an axle or a rotation speed of an output shaft of a transmission. Vehicle speed sensor 330 sends the detected physical quantity to ECU 320.

As motive power split mechanism 200, a planetary gear mechanism (planetary gear) is used to distribute the motive power of engine 120 to both drive wheels 160 and MG(1) 140A. By controlling a rotation speed of MG(1) 140A, motive power split mechanism 200 also functions as a continuously variable transmission.

In the hybrid vehicle equipped with a hybrid system as shown in FIG. 1, when engine 120 is operated with low efficiency, for example, at startup or during low-speed traveling, the hybrid vehicle travels using MG(2) 140B only. During normal traveling, for example, the motive power of engine 120 is split to two routes by motive power split mechanism 200, and one of the split motive powers is used to drive drive wheels 160 directly, and the other is used to drive MG(1) 140A and generate electric power. On this occasion, the generated electric power is used to drive MG(2) 140B, thereby providing assistance in driving drive wheels 160. During high-speed traveling, the electric power from traveling battery 220 is further supplied to MG(2) 140B to increase the output of MG(2) 140B, thereby adding a drive force to drive wheels 160.

On the other hand, during deceleration, MG(2) 140B, which is driven by drive wheels 160, functions as a generator to perform regenerative power generation, and collected electric power is stored in traveling battery 220. In a case where an amount of charge in traveling battery 220 is decreased and charging is required in particular, the output of engine 120 is increased to increase the power generation amount by MG(1) 140A and increase the amount of charge in traveling battery 220. As a matter of course, control for increasing a drive force of engine 120 may be performed if necessary, even during low-speed traveling. This control is performed for example when traveling battery 220 needs to be charged as described above, when an auxiliary machine such as an air-conditioner is driven, or when the temperature of the cooling water for engine 120 is raised to a prescribed temperature.

Furthermore, in the hybrid vehicle equipped with the hybrid system as shown in FIG. 1, engine 120 is stopped to improve fuel efficiency, depending on the operation state of the vehicle and the state of traveling battery 220. The operation state of the vehicle and the state of traveling battery 220 are also detected thereafter, and engine 120 is restarted. In this manner, engine 120 is intermittently operated. This is a difference from a conventional vehicle (i.e., a vehicle equipped with an engine only) in which, when an ignition switch is turned to a START position to start the engine, the engine is not stopped until the ignition switch is turned from an ON position to an ACC position or an OFF position.

Aqueous urea solution injection device 314 injects the aqueous urea solution into exhaust path 124 upstream of three-way catalytic converter 124B. Aqueous urea solution injection device 314 includes, for example, an injection nozzle and a pump. An aqueous urea solution tank 316 serving as a reserving unit reserving the aqueous urea solution is connected to aqueous urea solution injection device 314. Aqueous urea solution injection device 314 injects the aqueous urea solution drawn from aqueous urea solution tank 316 by the pump, from the injection nozzle into exhaust path 124, in a predetermined amount or until a predetermined time has passed, for example in accordance with an injection control signal from ECU 320. Any reducing agent reducing NOx can be injected into exhaust path 124, and the reducing agent is not particularly limited to the aqueous urea solution. Further, ECU 320 may be configured to control aqueous urea solution injection device 314 such that the aqueous urea solution is injected into exhaust path 124 based on an NOx concentration detected from an NOx concentration sensor (not shown), or may be configured to control aqueous urea solution injection device 314 such that the aqueous urea solution is injected into exhaust path 124 when an operation point of engine 120 is in a region with an increased NOx concentration.

An aqueous urea solution amount sensor 312 detects an amount of the aqueous urea solution reserved in aqueous urea solution tank 316. Specifically, aqueous urea solution amount sensor 312 detects the reserved amount of the aqueous urea solution by detecting a position of a solution level of the aqueous urea solution. Aqueous urea solution amount sensor 312 sends a signal indicating the detected reserved amount to ECU 320.

A display device 340 informs a driver of the reserved amount of the aqueous urea solution reserved in aqueous urea solution tank 316. Specifically, display device 340 is disposed around the driver's seat to provide display corresponding to a degree of the solution amount in aqueous urea solution tank 316.

Figure 2:
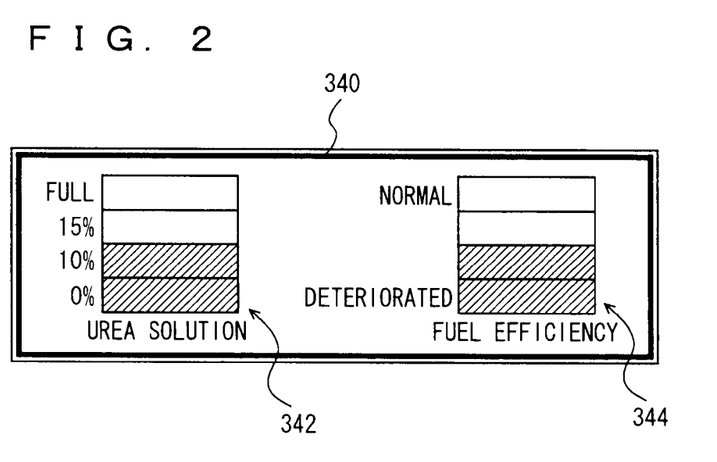
FIG. 2 is a view showing a configuration of a display device.

As shown in FIG. 2, display device 340 includes a solution amount indicator 342 and a fuel efficiency indicator 344. Solution amount indicator 342 is configured, for example, such that four rectangular illumination regions are arranged to be adjacent to one another in a vertical direction in a paper plane of FIG. 2. The four illumination regions correspond to "0%", "10%", "15%", and "FULL", respectively, from the bottom of the paper plane of FIG. 2. It is to be noted that "0%" indicates that the amount of the aqueous urea solution is "equal to or more than 0%" with respect to a maximum reserved amount. "10%" indicates that the amount of the aqueous urea solution is "equal to or more than 10%" with respect to the maximum reserved amount. "15%" indicates that the amount of the aqueous urea solution is "equal to or more than 15%" with respect to the maximum reserved amount. Further, "FULL" indicates that the amount of the aqueous urea solution is the maximum reserved amount. Solution amount indicator 342 displays the solution amount by illuminating an illumination region corresponding to the solution amount and not illuminating an illumination region not corresponding to the solution amount.

FIG. 2 shows a state where the illumination region corresponding to "0%" and the illumination region corresponding to "10%" are illuminated. In this case, solution amount indicator 342 displays that the solution amount is "equal to or more than 0%", "equal to or more than 10%", and not "equal to or more than 15%". That is, the manner of illumination of FIG. 2 informs the driver that the solution amount is equal to or more than 0% and less than 15%. It is to be noted that the illumination regions of solution amount indicator 342 are not particularly limited to have a rectangular shape, and the number of the illumination regions is not limited to four. The illumination regions of solution amount indicator 342 may be, for example, illuminated by LEDs (Light Emitting Diodes), or displayed on an LCD (Liquid Crystal Display). In solution amount indicator 342, each illumination region is illuminated or unilluminated based on a solution amount display control signal from ECU 320.

Although the present embodiment describes the case where "equal to or more than 0%", "equal to or more than 10%", "equal to or more than 15%", and "FULL" are indicated to display the solution amount, any display is sufficient as long as it can inform the driver of at least presence or absence of the solution amount, and indication is not limited to these values.

Fuel efficiency indicator 344 is configured, for example, such that four rectangular illumination regions are arranged to be adjacent to one another in the vertical direction in the paper plane of FIG. 2. Among the four illumination regions, an upper end portion in the vertical direction in the paper plane of FIG. 2 corresponds to "NORMAL", and a lower end portion corresponds to "DETERIORATED" Fuel efficiency indicator 344 displays a degree of deterioration of fuel efficiency in four levels by illuminating an illumination region corresponding to the state of fuel efficiency and not illuminating an illumination region not corresponding to the state of fuel efficiency. In the present embodiment, the illumination regions are configured such that they are all illuminated when the fuel efficiency is normal, and are unilluminated from the illumination region on the "NORMAL" side as the fuel efficiency is deteriorated, in accordance with the degree of deterioration. However, the illumination regions may be configured such that only one illumination region corresponding to the degree of deterioration of fuel efficiency is illuminated among the four illumination regions.

FIG. 2 shows a state where lower two illumination regions in FIG. 2 are illuminated. In this case, the degree of deterioration of fuel efficiency lower than a normal level by two levels is displayed. It is to be noted that the illumination regions of fuel efficiency indicator 344 are not limited to have a rectangular shape, and the number of the illumination regions is not limited to four. The illumination regions of fuel efficiency indicator 344 may be, for example, illuminated by LEDs, or displayed on an LCD. In fuel efficiency indicator 344, each illumination region is illuminated or unilluminated based on a fuel efficiency display control signal from ECU 320.

In the vehicle having a configuration as described above, the present invention is characterized in that ECU 320 changes an operation line of engine 120 to an operation line with a lower degree of generation of NOx step by step in accordance with a decrease in the detected reserved amount of the aqueous urea solution, and controls the output of engine 120 based on the changed operation line. The operation line changed in accordance with the decrease in the reserved amount is an operation line with a lower degree of generation of torque with respect to a rotation speed of engine 120, when compared with the operation line before change.

Figure 3:
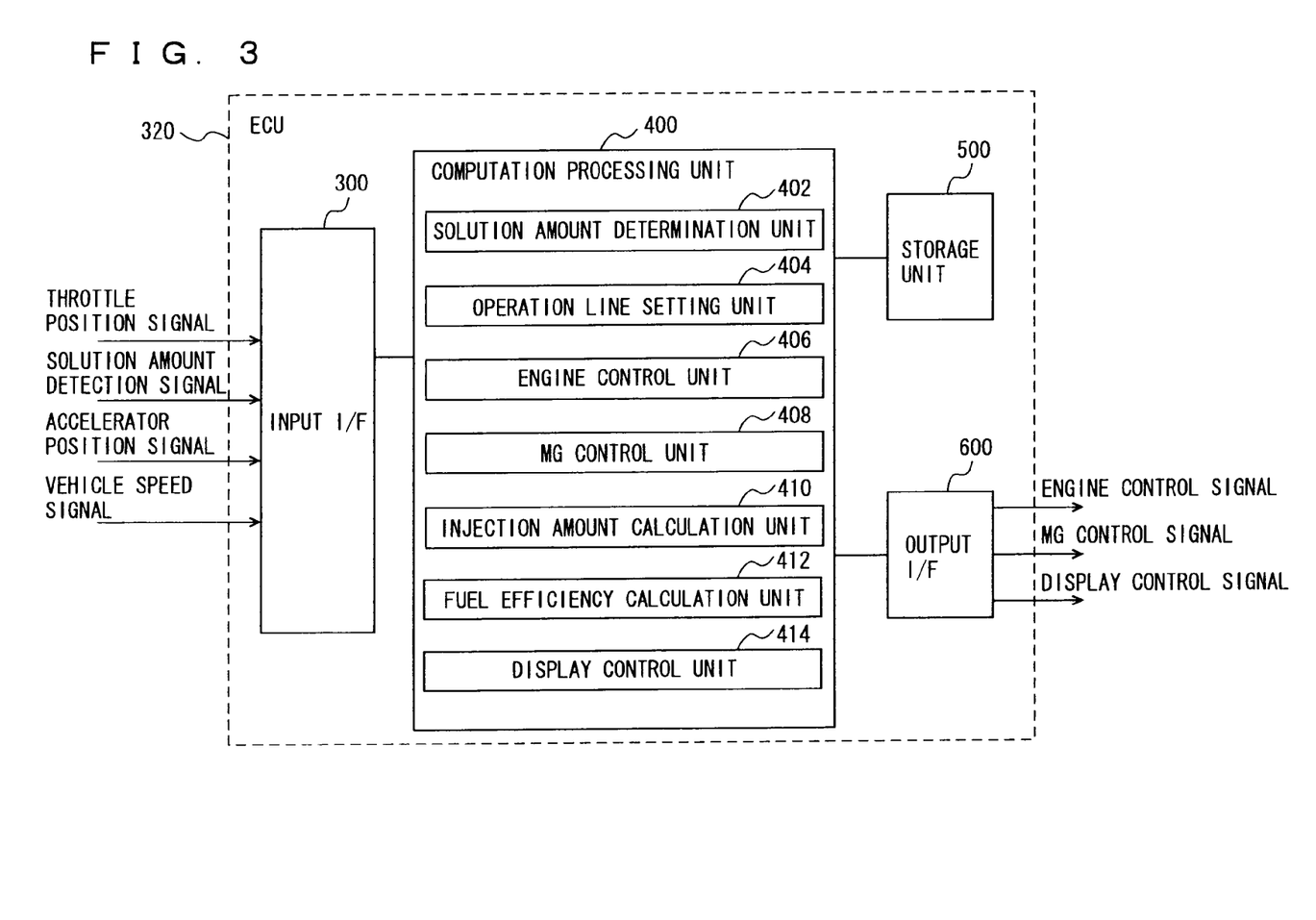
FIG. 3 is a functional block diagram showing a configuration of an ECU as a control device for a vehicle in accordance with the present embodiment.

FIG. 3 shows a functional block diagram of ECU 320 as the control device for the vehicle in accordance with the present embodiment.

ECU 320 includes an input interface (hereinafter referred to as an input I/F) 300, a computation processing unit 400, a storage unit 500, and an output interface (hereinafter referred to as an output I/F) 600.

Input I/F 300 receives a throttle position signal from throttle position sensor 122D, a solution amount detection signal from aqueous urea solution amount sensor 312, an accelerator position signal from accelerator position sensor 318, and a vehicle speed signal from vehicle speed sensor 330, and sends the signals to computation processing unit 400.

Computation processing unit 400 includes a solution amount determination unit 402, an operation line setting unit 404, an engine control unit 406, an MG control unit 408, an injection amount calculation unit 410, a fuel efficiency calculation unit 412, and a display control unit 414.

Solution amount determination unit 402 determines whether or not the solution amount is equal to or more than 15% based on the solution amount detection signal. When the solution amount is less than 15%, solution amount determination unit 402 determines whether or not the solution amount is equal to or more than 10%.

Specifically, solution amount determination unit 402 determines whether or not the detected solution amount is equal to or more than a reserved amount corresponding to 15% of the maximum reserved amount in the reserving unit, and when the detected solution amount is less than the reserved amount corresponding to 15%, solution amount determination unit 402 determines whether or not the detected solution amount is equal to or more than a reserved amount corresponding to 10% of the maximum reserved amount. Solution amount determination unit 402 may, for example, turn on a FULL-15% determination flag when the detected solution amount is equal to or more than the reserved amount corresponding to 15%, turn on a 10% determination flag when the detected solution amount is equal to or more than the reserved amount corresponding to 10%, and turn on a 0% determination flag when the detected solution amount is less than the reserved amount corresponding to 10%.

Figure 4:
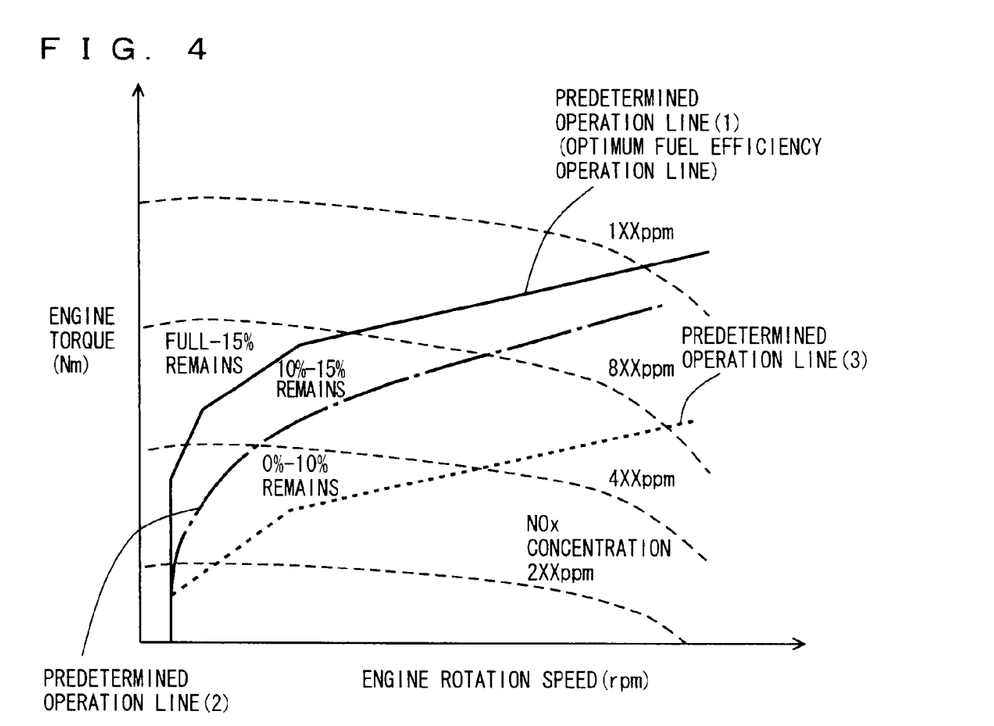
FIG. 4 is a view showing a plurality of operation lines set in accordance with amounts of an aqueous urea solution (type 1).

Operation line setting unit 404 sets an operation line with a lower degree of generation of NOx in accordance with a decrease in the detected solution amount. For example, predetermined operation lines (1) to (3) shown in FIG. 4 are stored beforehand in storage unit 500. Operation line setting unit 404 reads an operation line corresponding to the detected solution amount from storage unit 500.

The predetermined operation line (1) indicated by a solid line in FIG. 4 represents an optimum fuel efficiency operation line, and corresponds to an operation line of engine 120 when the solution amount is equal to or more than 15%. The predetermined operation line (2) indicated by a dash-dot line in FIG. 4 corresponds to an operation line of engine 120 when the solution amount is equal to or more than 10% and less than 15%. The predetermined operation line (3) indicated by a broken line in FIG. 4 corresponds to an operation line of engine 120 when the solution amount is equal to or more than 0% and less than 10%. The number of operation lines is not limited to three, and four or more operation lines may be used.

The predetermined operation lines (1) to (3) are satisfactorily provided as long as they are adapted through experiments or the like, and in particular the predetermined operation line (3) is set such that appropriate exhaust gas purification performance is exhibited when the solution amount is 0%. For example, the predetermined operation line (3) is set to have a lower degree of generation of torque with respect to the rotation speed of engine 120, when compared with the optimum fuel efficiency operation line. Thereby, an increase in the NOx concentration can be suppressed in an entire rotation range of engine 120, when compared with the predetermined operation line (1). The predetermined operation line (2) is set between the predetermined operation line (1) and the predetermined operation line (3).

Specifically, the predetermined operation line (2) is set to have a degree of generation of torque with respect to the rotation speed of engine 120 that is lower than that of the predetermined operation line (1) and higher than that of the predetermined operation line (3).

Based on the detected solution amount, operation line setting unit 404 reads one of the predetermined operation lines (1) to (3) from storage unit 500 and set the operation line. Operation line setting unit 404 may be configured, for example, to read and set the predetermined operation line (1) when the FULL-15% determination flag is on, may be configured to read and set the predetermined operation line (2) when the 10% determination flag is on, and may be configured to read and set the predetermined operation line (3) when the 0% determination flag is on.

Engine control unit 406 controls engine 120 based on the set operation line. Specifically, a drive force required to the vehicle is specified based on an accelerator position and a vehicle speed. Based on the specified drive force and the set operation line, engine control unit 406 specifies an operation point on the operation line and controls engine 120 to be in an operation state corresponding to the specified operation point. For example, engine control unit 406 controls a throttle position, a fuel injection amount, ignition timing, and the like of engine 120, and controls engine 120 to be in an operation state corresponding to the specified operation point.

When the set operation line is changed, engine control unit 406 controls engine 120 to be in an operation state corresponding to an operation point that has been moved from an operation point on the operation line before change onto a changed operation line, along an equal output line.

MG control unit 408 controls MG(1) 140A and MG(2) 140B in parallel with the control of engine 120.

Specifically, MG control unit 408 sets a degree of power generation by engine 120 (i.e., a degree of a drive force to be transmitted from engine 120 to the wheels) based on the specified drive force, and controls MG(1) 140A to be in an operation state corresponding to the set degree.

MG control unit 408 also sets a degree of a drive force to be transmitted from MG(2) 140B to the wheels based on the specified drive force, and controls MG(2) 140B to be in an operation state corresponding to the set degree.

The required drive force is generated in the vehicle by the operation of engine 120, MG(1) 140A, and MG(2) 140B.

Injection amount calculation unit 410 calculates a fuel injection amount for each time when engine 120 is rotated in a predetermined number of rotations. Injection amount calculation unit 410 may calculate the injection amount, for example, based on an integrated value of injection times in a period in which engine 120 is rotated in a predetermined number of rotations.

Fuel efficiency calculation unit 412 calculates the degree of deterioration of fuel efficiency. For example, fuel efficiency calculation unit 412 calculates instantaneous fuel efficiency based on a traveling distance of the vehicle and the fuel injection amount for each time when engine 120 is rotated in a predetermined number of rotations. Fuel efficiency calculation unit 412 calculates the degree of deterioration of fuel efficiency in accordance with a deviation between an average value of instantaneous fuel efficiencies in a previous predetermined traveling period (distance or time) and an average value in the past. Alternatively, fuel efficiency calculation unit 412 may calculate the degree of deterioration of fuel efficiency in accordance with a deviation between average fuel efficiency in a previous predetermined traveling period and average fuel efficiency in the past.

Display control unit 414 generates a display control signal corresponding to solution amount indicator 342 based on the determined solution amount, and sends the display control signal to display device 340 through output I/F 600. The display control signal corresponding to solution amount indicator 342 is, for example, a signal indicating which of the four illumination regions of solution amount indicator 342 is to be illuminated.

Further, display control unit 414 generates a display control signal corresponding to fuel efficiency indicator 344 based on the calculated degree of deterioration of fuel efficiency, and sends the display control signal to display device 340 through output I/F 600. The display control signal corresponding to fuel efficiency indicator 344 is, for example, a signal indicating which of the four illumination regions of fuel efficiency indicator 344 is to be illuminated.

Although the present embodiment describes a case where all of solution amount determination unit 402, operation line setting unit 404, engine control unit 406, MG control unit 408, injection amount calculation unit 410, fuel efficiency calculation unit 412, and display control unit 414 function as software implemented by an CPU (Central Processing Unit) as computation processing unit 400 executing a program stored in storage unit 500, they may be configured to be implemented by hardware. Such a program is recorded in a storage medium and mounted in the vehicle.

Storage unit 500 stores various types of information, programs, threshold values, maps, and the like, and data is read from computation processing unit 400 and stored therein, as necessary.

Figure 5:
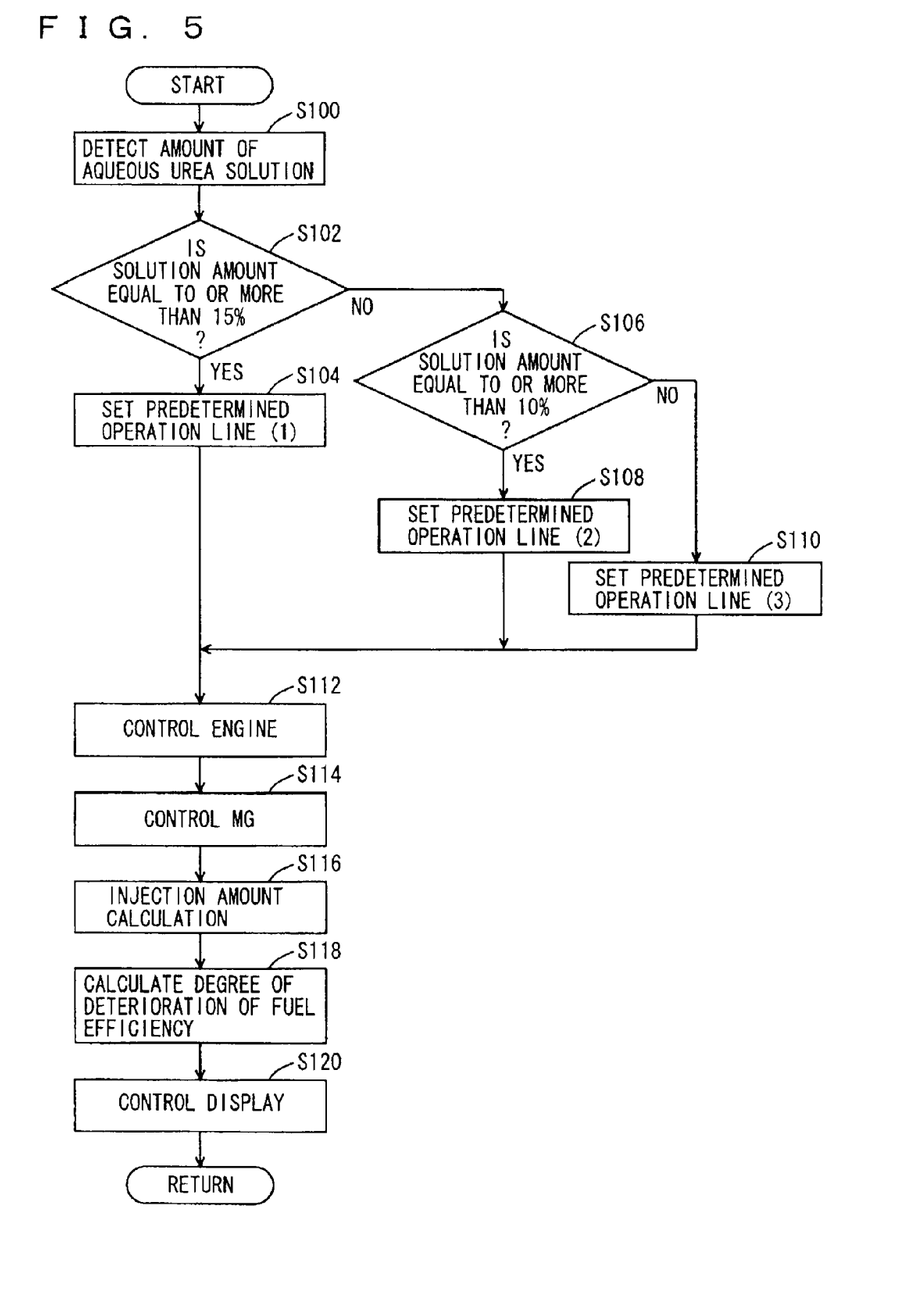
FIG. 5 is a flowchart illustrating a control structure of a program executed in the ECU as the control device for the vehicle in accordance with the present embodiment.

Hereinafter, a control structure of a program executed in ECU 320 as the control device for the vehicle in accordance with the present embodiment will be described with reference to FIG. 5.

In step (hereinafter referred to as S) 100, ECU 320 detects the amount of the aqueous urea solution.

In S102, ECU 320 determines whether or not the detected amount of the aqueous urea solution is equal to or more than 15%. If the detected amount of the aqueous urea solution is equal to or more than 15% (YES in S102), the process goes to S104. Otherwise (NO in S102), the process goes to S106. In S104, ECU 320 sets the predetermined operation line (1) as an operation line of engine 120.

In S106, ECU 320 determines whether or not the detected amount of the aqueous urea solution is equal to or more than 10%. If the amount of the aqueous urea solution is equal to or more than 10% (YES in S106), the process goes to S108. Otherwise (NO in S106), the process goes to S110. In S108, ECU 320 sets the predetermined operation line (2) as an operation line of engine 120.

In S110, ECU 320 sets the predetermined operation line (3) as an operation line of engine 120. In S112, ECU 320 controls an output of engine 120 based on the traveling state of the vehicle (i.e., the accelerator position and the vehicle speed) and the set operation line. In S114, ECU 320 controls outputs of MG(1) 140A and MG(2) 140B based on the traveling state of the vehicle.

In S116, ECU 320 calculates the fuel injection amount. In S118, ECU 320 calculates the degree of deterioration of fuel efficiency. In S120, ECU 320 controls display device 340 to display the amount of the aqueous urea solution and the degree of deterioration of fuel efficiency at solution amount indicator 342 and fuel efficiency indicator 344, respectively.

An operation of ECU 320 as the control device for the vehicle in accordance with the present embodiment based on the structure and the flowchart described above will be described with reference to FIG. 6.

Figure 6:
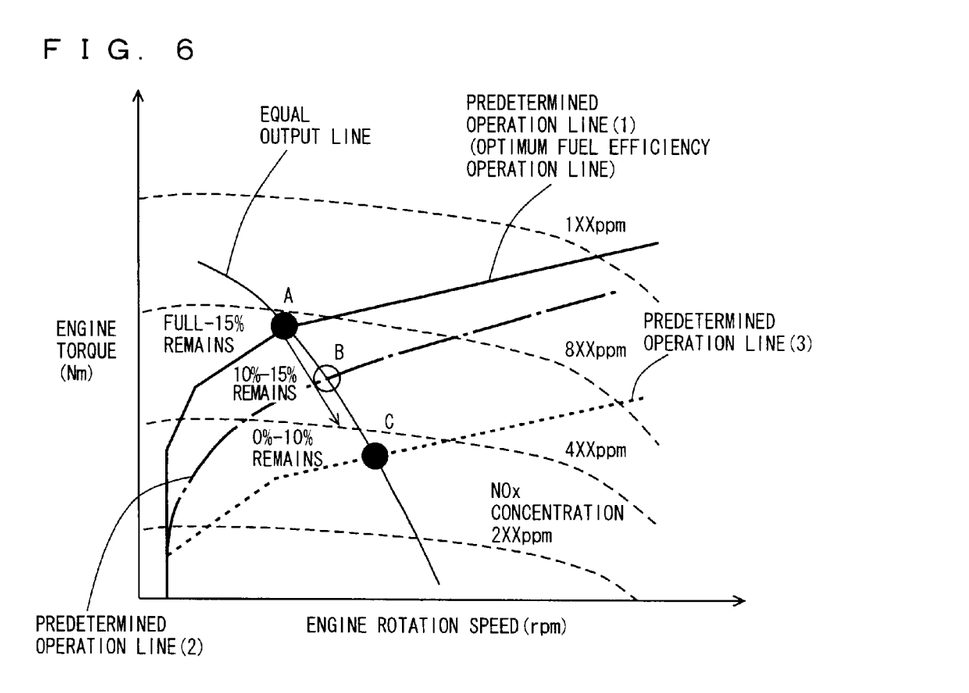
FIG. 6 is a view showing a plurality of operation lines set in accordance with amounts of an aqueous urea solution (type 2).

For example, it is assumed that the amount of the aqueous urea solution is equal to or more than 15%. If the amount of the aqueous urea solution is equal to or more than 15% (YES in S102), the predetermined operation line (1) indicated by the solid line in FIG. 6 is set as an operation line of engine 120 (S104). Accordingly, engine 120 is controlled to operate along the predetermined operation line (1) (S112). Along with the control of engine 120, MG(1) 140A and MG(2) 140B are controlled (S114). Further, the fuel injection amount is calculated (S116), the degree of deterioration of fuel efficiency is calculated (S118), and the solution amount and the degree of deterioration of fuel efficiency are displayed at solution amount indicator 342 and fuel efficiency indicator 344, respectively, of display device 340 (S120). Since engine 120 operates along the optimum fuel efficiency operation line, the four illumination regions are all illuminated in fuel efficiency indicator 344.

When the aqueous urea solution is injected repeatedly as the vehicle travels and the amount of the aqueous urea solution becomes less than 15% (NO in S102) and equal to or more than 10% (YES in S106), the predetermined operation line (2) indicated by the dash-dot line in FIG. 6 is set as an operation line of engine 120 (S108). Accordingly, engine 120 is controlled along the predetermined operation line (2) (S112).

On this occasion, for example, in a case where a point A of FIG. 6 serves as an operation point when engine 120 is controlled along the predetermined operation line (1) and then the predetermined operation line (2) is set, engine 120 is controlled using a point B of FIG. 6 as an operation point. In this case, point A and point B have a relationship that they are operation points on an equal output line.

Along with the control of engine 120, the outputs of MG(1) 140A and MG(2) 140B are controlled (S114). Further, the fuel injection amount is calculated (S116), the degree of deterioration of fuel efficiency is calculated (S118), and the amount of the aqueous urea solution and the degree of deterioration of fuel efficiency are displayed at solution amount indicator 342 and fuel efficiency indicator 344, respectively, of display device 340 (S120).

Since the predetermined operation line (2) is an operation line set on a side with a lower NOx concentration when compared with the predetermined operation line (1), deterioration of the exhaust gas purification performance is suppressed. It is to be noted that, since the predetermined operation line (2) is an operation line deviated from the optimum fuel efficiency operation line, the fuel efficiency tends to be deteriorated when compared with a case where engine 120 is operated on the optimum fuel efficiency operation line. Therefore, in fuel efficiency indicator 344, only the illumination region on the deterioration side rather than the normal side is illuminated. Thereby, the driver is informed of a decrease in the solution amount and deterioration of the fuel efficiency.

When the aqueous urea solution is further injected repeatedly and the amount of the aqueous urea solution becomes less than 15% and less than 10% (NO in S102, NO in S106), the predetermined operation line (3) indicated by the broken line in FIG. 6 is set as an operation line of engine 120 (S110). Accordingly, engine 120 is controlled along the predetermined operation line (3) (S112).

On this occasion, for example, in a case where point A of FIG. 6 serves as the operation point when engine 120 is controlled along the predetermined operation line (1) and then the predetermined operation line (3) is set, engine 120 is controlled using a point C of FIG. 6 as an operation point. In this case, point A and point C (and point B) have a relationship that they are operation points on the equal output line.

Along with the control of engine 120, the outputs of MG(1) 140A and MG(2) 140B are controlled (S114). Further, the fuel injection amount is calculated (S116), the degree of deterioration of fuel efficiency is calculated (S118), and the amount of the aqueous urea solution and the degree of deterioration of fuel efficiency are displayed at solution amount indicator 342 and fuel efficiency indicator 344, respectively, of display device 340 (S120).

Since the predetermined operation line (3) is an operation line set on a side with a lower NOx concentration when compared with the predetermined operation lines (1) and (2), deterioration of the exhaust gas purification performance is further suppressed. It is to be noted that, since the predetermined operation line (3) is an operation line deviated from the optimum fuel efficiency operation line, the fuel efficiency tends to be deteriorated when compared with the case where engine 120 is operated on the optimum fuel efficiency operation line. Thereby, the driver is informed of a decrease in the solution amount and deterioration of the fuel efficiency.

As has been described above, according to the control device for the vehicle in accordance with the present embodiment, an operation line of the engine is changed to an operation line on a side with a lower NOx concentration step by step in accordance with a decrease in the amount of the aqueous urea solution, which suppresses the driver from feeling that the vehicle's behavior suddenly becomes not normal when no aqueous urea solution is left. In addition, since the operation line of the engine is changed to an operation line with a lower degree of generation of NOx, an increase in the NOx concentration can be suppressed. Accordingly, an increase in the NOx concentration in exhaust gas can be suppressed. Further, when an operation point is changed from an operation point on the operation line before change to the changed operation line, on an equal output line, the vehicle can continue traveling without limiting the output of the engine. Consequently, a control device and a control method for a vehicle exhibiting performance corresponding to a driver's intention while suppressing an increase in nitrogen oxide in exhaust gas from an internal combustion engine when no reducing agent is reserved can be provided.

Further, when the operation line is changed to an operation line with a lower degree of generation of the NOx due to a decrease in the amount of the aqueous urea solution, the engine is operated with being deviated from the optimum fuel efficiency operation line, and thus fuel efficiency of the engine is deteriorated. Therefore, by informing the driver of the degree of deterioration of fuel efficiency, the driver can recognize that the fuel efficiency is worse than usual. That is, the driver can be urged to replenish the aqueous urea solution. Consequently, a control device and a control method for a vehicle appropriately informing a driver of presence or absence of a reducing agent can be provided.

Further, by informing the driver of a decrease in the reserved amount of the reducing agent, the driver can be urged to replenish the reducing agent. Consequently, the driver can be appropriately informed of presence or absence of the reducing agent.

It is to be noted that the present embodiment may employ a configuration controlling an output of the engine by detecting or calculating a residual amount of the aqueous urea solution in the aqueous urea solution tank reserving the aqueous urea solution as a reducing agent, and changing an operation point of the engine determined by the driver's request to an operation point on an equal output line with decreased emission of nitrogen oxide, in accordance with the detected or calculated residual amount of the aqueous urea solution.

Further, the configuration in accordance with the present invention described above may be applied to a hybrid vehicle, or a vehicle equipped with a CVT (Continuously Variable Transmission). However, since the hybrid vehicle can be driven using electric power from a traveling battery, the hybrid vehicle has less restrictions in changing an operation point and has a higher degree of freedom, when compared with the vehicle equipped with a CVT.

It should be understood that the embodiment disclosed herein is illustrative and non-restrictive in every respect. The scope of the present invention is defined by the scope of the claims, rather than the description above, and is intended to include any modifications within the scope and meaning equivalent to the scope of the claims.

The invention claimed is:

1. A control device for a vehicle equipped with an internal combustion engine, said internal combustion engine including an exhaust path, an injection device injecting a reducing agent to said exhaust path, and a reserving unit reserving said reducing agent, comprising:
   a reserved amount detection unit detecting a reserved amount of said reducing agent in said reserving unit; and
   a control unit receiving an output from said reserved amount detection unit,
   said control unit changing an operation line of said internal combustion engine to an operation line with a lower degree of generation of nitrogen oxide step by step in accordance with a decrease in said detected reserved amount, and controlling an output of said internal combustion engine based on said changed operation line,
   said control unit controlling the output of said internal combustion engine by changing an operation point along an equal output line in accordance with change of said operation line.

2. The control device for a vehicle according to claim 1, wherein the operation line changed in accordance with the decrease in said reserved amount is an operation line with a lower degree of generation of torque with respect to a rotation speed of said internal combustion engine, when compared with the operation line before change.

3. The control device for a vehicle according to claim 1, wherein
   the operation line of said internal combustion engine is set corresponding to a case where the reserved amount of said reducing agent in said reserving unit is equal to or more than a predetermined amount, and includes at least a first operation line as an optimum fuel efficiency operation line of said internal combustion engine, a second operation line set corresponding to a case where the reserved amount of said reducing agent in said reserving unit is zero, and a third operation line set between said first operation line and said second operation line, and
   said control unit changes the operation line of said internal combustion engine to an operation line corresponding to said detected reserved amount among said first operation line, said second operation line, and said third operation line.

4. The control device for a vehicle according to claim 1, further comprising:
   a traveling distance detection unit detecting a physical quantity related to a traveling distance of said vehicle; and
   a fuel efficiency informing unit, wherein
   said control unit includes
     an injection amount calculation unit calculating an injection amount of fuel injected to said internal combustion engine, and
     a deterioration degree calculation unit calculating a degree of deterioration of fuel efficiency of said internal combustion engine based on said detected physical quantity and a supply amount of said fuel, and
   said fuel efficiency informing unit informs a driver of said calculated degree of deterioration of fuel efficiency.

5. The control device for a vehicle according to claim 1, further comprising a solution amount informing unit informing a driver of said detected reserved amount.

6. The control device for a vehicle according to claim 1, wherein said internal combustion engine is a lean burn gasoline engine.

7. The control device for a vehicle according to claim 1, wherein said internal combustion engine is a diesel engine.

8. The control device for a vehicle according to claim 1, wherein said vehicle is a hybrid vehicle having said internal combustion engine and a rotating electric machine as drive sources.

9. The control device for a vehicle according to claim 1, wherein said vehicle is a vehicle equipped with a continuously variable transmission continuously changing a gear ratio.

10. The control device for a vehicle according to claim 2, wherein
    the operation line of said internal combustion engine is set corresponding to a case where the reserved amount of said reducing agent in said reserving unit is equal to or more than a predetermined amount, and includes at least a first operation line as an optimum fuel efficiency operation line of said internal combustion engine, a second operation line set corresponding to a case where the reserved amount of said reducing agent in said reserving unit is zero, and a third operation line set between said first operation line and said second operation line, and
    said control unit changes the operation line of said internal combustion engine to an operation line corresponding to said detected reserved amount among said first operation line, said second operation line, and said third operation line.

11. A control method for a vehicle equipped with an internal combustion engine, said internal combustion engine including an exhaust path, an injection device injecting a reducing agent to said exhaust path, and a reserving unit reserving said reducing agent, comprising the steps of:
    detecting a reserved amount of said reducing agent in said reserving unit; and
    changing an operation line of said internal combustion engine to an operation line with a lower degree of generation of nitrogen oxide step by step in accordance with a decrease in said detected reserved amount, and controlling an output of said internal combustion engine based on said changed operation line,
    the step of controlling the output of said internal combustion engine controlling the output of said internal combustion engine by changing an operation point along an equal output line in accordance with change of said operation line.

12. The control method for a vehicle according to claim 11, wherein the operation line changed in accordance with the decrease in said reserved amount is an operation line with a lower degree of generation of torque with respect to a rotation speed of said internal combustion engine, when compared with the operation line before change.

13. The control method for a vehicle according to claim 11, wherein
the operation line of said internal combustion engine is set corresponding to a case where the reserved amount of said reducing agent in said reserving unit is equal to or more than a predetermined amount, and includes at least a first operation line as an optimum fuel efficiency operation line of said internal combustion engine, a second operation line set corresponding to a case where the reserved amount of said reducing agent in said reserving unit is zero, and a third operation line set between said first operation line and said second operation line, and
the step of controlling the output of said internal combustion engine changes the operation line of said internal combustion engine to an operation line corresponding to said detected reserved amount among said first operation line, said second operation line, and said third operation line.

14. The control method for a vehicle according to claim 11, further comprising the steps of:
detecting a physical quantity related to a traveling distance of said vehicle;
calculating an injection amount of fuel injected to said internal combustion engine;
calculating a degree of deterioration of fuel efficiency of said internal combustion engine based on said detected physical quantity and a supply amount of said fuel; and
informing a driver of said calculated degree of deterioration of fuel efficiency.

15. The control method for a vehicle according to claim 11, further comprising the step of informing a driver of said detected reserved amount.

16. The control method for a vehicle according to claim 11, wherein said internal combustion engine is a lean burn gasoline engine.

17. The control method for a vehicle according to claim 11, wherein said internal combustion engine is a diesel engine.

18. The control method for a vehicle according to claim 11, wherein said vehicle is a hybrid vehicle having said internal combustion engine and a rotating electric machine as drive sources.

19. The control method for a vehicle according to claim 11, wherein said vehicle is a vehicle equipped with a continuously variable transmission continuously changing a gear ratio.

20. The control method for a vehicle according to claim 12, wherein
the operation line of said internal combustion engine is set corresponding to a case where the reserved amount of said reducing agent in said reserving unit is equal to or more than a predetermined amount, and includes at least a first operation line as an optimum fuel efficiency operation line of said internal combustion engine, a second operation line set corresponding to a case where the reserved amount of said reducing agent in said reserving unit is zero, and a third operation line set between said first operation line and said second operation line, and
the step of controlling the output of said internal combustion engine changes the operation line of said internal combustion engine to an operation line corresponding to said detected reserved amount among said first operation line, said second operation line, and said third operation line.

21. A control device for a vehicle equipped with an internal combustion engine, said internal combustion engine including an exhaust path, a catalyst disposed at said exhaust path for purifying nitrogen oxide in exhaust gas, a reducing agent supply device supplying a reducing agent into said exhaust path from upstream of said catalyst, and a reducing agent tank reserving said reducing agent, said vehicle including a drive mechanism setting an output of said internal combustion engine to a state in accordance with a driver's request at a drive shaft,
said control device comprising:
a reducing agent residual amount recognition unit for detecting or calculating a residual amount of said reducing agent in said reducing agent tank; and
a control unit controlling the output of said internal combustion engine by changing an operation point of said internal combustion engine determined by said driver's request to an operation point on an equal output line with decreased emission of the nitrogen oxide, in accordance with said detected or calculated residual amount of the reducing agent.

* * * * *